US004001571B2

United States Statutory Invention Registration [19]

[11] Reg. Number: H1571

[45] Published: Aug. 6, 1996

Hansen et al.

[54] DUAL-FEED, DUAL-MODE ANTENNA FOR MONO-DIRECTIONAL PATTERN

[76] Inventors: Peder M. Hansen, 4021 Caminito Dehesa, San Diego, Calif. 92107; James H. Schukantz, 7210 Astoria St., San Diego, Calif. 92111

[21] Appl. No.: 267,995

[22] Filed: Jun. 29, 1994

[51] Int. Cl.[6] ..... H01Q 7/04; H01Q 21/00

[52] U.S. Cl. ..... 343/728; 343/842

[58] Field of Search ..... 343/728, 842; H01Q 7/04, 21/00

[56] References Cited

U.S. PATENT DOCUMENTS

| | | | |
|---|---|---|---|
| 1,924,408 | 8/1933 | Leib . | |
| 3,882,506 | 5/1975 | Mori et al. . | |
| 3,902,177 | 8/1975 | Mori et al. . | |
| 4,083,006 | 4/1978 | Yokoshima . | |
| 4,121,216 | 10/1978 | Bunch et al. . | |
| 4,219,821 | 8/1980 | Selim | 343/728 |
| 4,433,336 | 2/1984 | Carr . | |

*Primary Examiner*—Michael J. Carone

[57] ABSTRACT

A compact transmitting and receiving antenna has dual feeds permitting magnetic and electric dipole radiation. The antenna includes a loop antenna disposed within a loop shield and a mast. The loop shield is insulated from ground and a feed is provided to it and the mast to excite these as an electric monopole. The shield becomes part of the monopole antenna and provides the benefits of top-loading. An isolation transformer permits the simultaneous transmission of monopole and dipole radiation. The transformer converts an unbalanced coaxial feed line to the balanced loop antenna and isolates the monopole feed voltage from the loop antenna feed. To eliminate the affect of the monopole feed on the loop feed, and vice versa, the components on the high side of the monopole feed (the loop shield and mast) are driven in common mode (voltage) by the monopole feed, and will not couple the loop antenna feed through the transformer windings. Thus, with respect to the monopole feed voltage, both sides of the transformer windings connected to a loop antenna will be at the same voltage. No voltage drop across the transformer windings due to the monopole feed voltage will occur and hence no coupling to the loop feed transmitter will take place. The voltage insulation requirements are concentrated at the monopole feed point so that the isolation feed transformer takes all the voltage, making the loop, loop shield and monopole driven in common mode.

16 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOOP PATTERN

MONOPOLE PATTERN

DUAL-FEED, DUAL-MODE ANTENNA FOR MONO-DIRECTIONAL PATTERN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention pertains broadly to the field of antennas. More particularly, the invention pertains to directional antennas.

For some applications it is desirable to transmit a signal in all directions equally, but for certain applications it is desirable to direct a signal in a specific direction and avoid radiation in other directions. This is particularly true in radio applications and even more so in military radio applications. All antennas are directional to a degree, that is, antennas will radiate more strongly in certain directions than others. Directional antennas, however, are designed to enhance this feature.

Some directional antennas depend upon radiation from two or more antenna elements added vectorially. If the waves radiated from the elements add in a particular direction, the signal will be strong in this direction, while if they tend to cancel or subtract in a certain direction, a signal will be nonexistent or weaker in that direction.

It is well known that the combination of a loop antenna and a monopole antenna can give a single or mono-directional antenna pattern. This is a common configuration used in radio direction finding. The loop antenna itself is a simple form of a directional antenna. FIG. 1A contains the pattern of a magnetic dipole (loop) antenna. This figure eight radiation pattern is constructed by drawing the magnitude of the power radiated by the antenna in all directions around a circle so that the distance from the center represents the magnitude of the signal in each direction. The directional pattern of the loop antenna may be altered by adding the radiation from a separate monopole (vertical) antenna. The radiation pattern of this monopole antenna is omnidirectional as shown in FIG. 1B.

FIG. 2 contains several combinations of the monopole and loop antenna elements. For all cases shown, the elements are assumed to be in-phase and all that is varied is the relative radiation magnitude of the antenna elements. The case in which the maximum value of the magnetic dipole (loop) antenna is equal to that of the monopole (vertical) antenna will give a perfect cardioid, as shown in FIG. 2A. This pattern is only achieved exactly at one elevation angle, namely the angle at which the radiation from the monopole is equal to the radiation from the magnetic dipole. The radiation is greatly reduced at other elevations in the direction of the cardioid null.

In the prior art there exists a radio direction finder described in U.S. Pat. No. 1,924,408 issued to August Leib. Leib shows a mast mounted shielded loop antenna with the mast and shield forming a monopole antenna. Because Leib's antenna is designed solely for receiving, the critical issues of feeding and isolating the two antenna elements are not addressed. Leib does not discuss feeding his loop antenna in a balanced manner, nor does he address the matter of isolation required for operating a dual-feed antenna at transmitting voltage levels.

An antenna for direction finding having mast isolation is described in U.S. Pat. No. 3,882,506 issued to Kenzo Mori et al. This antenna includes a monopole antenna that extends through and above two crossed-loop antennas. Transformers are used for both the loop and monopole feeds. In this invention, the shields of the loop antennas are not part of the monopole antenna system. Further, Mori was not concerned with high voltages as his invention is strictly for receiving direction finding. This is apparent as his vertical antenna must pass through a high impedance portion of his loop antennas, specifically the gap at the top of the loop antennas. This antenna, if used for transmitting, will lead to very high voltages at this point with the possibility of voltage flashover from one antenna to the other.

In yet a third scheme, Alan Carr has described a three-element antenna formed of orthogonal loops mounted on a monopole in U.S. Pat. No. 4,433,336. Carr's invention includes a base-insulated monopole antenna mast upon which crossed loops are mounted. The loops of Carr's invention are not shielded. In Carr's invention, the feed line for his loop antennas must pass across the feed point for his monopole antenna. This monopole feed point can be at very high voltage if the monopole is operated well below self-resonance. Isolation therefore must be provided to keep the loops from effectively shorting out the monopole antenna feed. Carr's invention uses a double ferrite choke on the outside of a coaxial cable to provide such isolation, however such chokes are known to be poor isolators especially in frequency ranges of interest to the United States Navy (VLF-HF or approx. 3 kHz to 30 MHz). In addition, Carr's invention uses a small loop inside a larger loop as a feed. This type of feed has the advantage of providing an impedance transformation, however, it is not a true balun as the shield of the coax feeding the loop of the antenna is directly connected to the monopole antenna structure. This will cause current to flow on the outside of the loop feed coax which will affect both impedance and radiation patterns of the antenna in ways difficult to predict.

SUMMARY OF THE INVENTION

The invention is a compact single transmitting and receiving antenna structure having dual feeds enabling the generation of both magnetic dipole and electric dipole radiation. The invention includes one or more shielded loop antennas disposed upon a monopole antenna mast. The shield of each loop is insulated from ground and a feed is provided to it and the monopole mast to excite these in the mode of an electric monopole antenna. The shield or shields thus become part of the monopole antenna and provide the benefits of top-loading.

In the invention, a single isolation transformer is used to permit the simultaneous transmission of monopole and dipole radiation. The isolation transformer provides the conversion from an unbalanced coaxial feed line to the balanced loop antenna or antennas and serves as a true balun for feeding the loops (permitting separate control of the current in the monopole and loops). The isolation transformer also provides isolation to decouple the monopole feed voltage from the loop antenna feed.

To eliminate the effect of the monopole feed on the loop antenna feeds, and vice versa, the components on the high side of the monopole feed (the loop shields and mast support structure) are driven in common mode (voltage) by the monopole feed, and will not couple the loop antenna feed through the transformer windings. Thus, with respect to the monopole feed voltage, both sides of the transformer windings connected to an individual loop antenna will be at the same voltage. There will be no voltage drop across the transformer windings due to the monopole feed voltage and hence no coupling back to the loop feed transmitter. The monopole feed voltage is dropped across the isolation transformer. Thus, the voltage insulation requirements are all concentrated at the monopole feed point so that the isolation feed transformer takes all the voltage, making the loop, loop shield and monopole mast driven in common mode.

OBJECTS OF THE INVENTION

It is an object of this invention to provide an improved antenna.

Another object of this invention is to provide an improved antenna that utilizes a single antenna structure to provide both magnetic dipole and electric dipole radiation.

Yet another object of this invention is to provide a compact antenna that utilizes a single antenna structure to provide both magnetic dipole and electric dipole radiation.

A further object of this invention is to provide an improved antenna having a single antenna structure incorporating magnetic dipole and monopole elements that are sufficiently isolated and insulated to permit both the reception and transmission of signals without one antenna element adversely affecting the other antenna element.

Other objects, advantages and new features of the invention will become apparent from the following detailed description of the invention when considered in conjunction with the accompanied drawings.

DESCRIPTION OF THE PREFERRED EMBODIMENTS

Figure 1A:
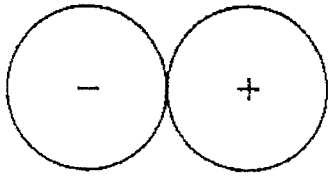
FIGS. 1A and 1B illustrate graphically the antenna patterns taken from loop and monopole antenna elements respectively.
Figure 1B:
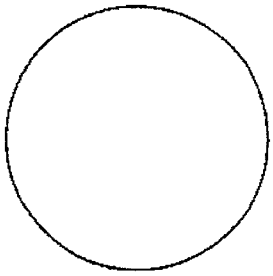
Figure 2A:
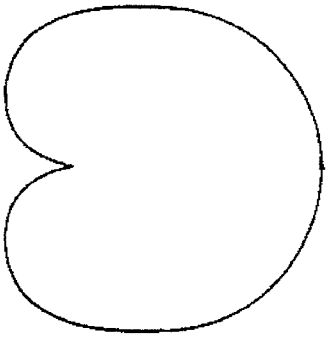
FIGS. 2A–2C illustrate antenna patterns of various combinations of loop and monopole radiation patterns.
Figure 2B:
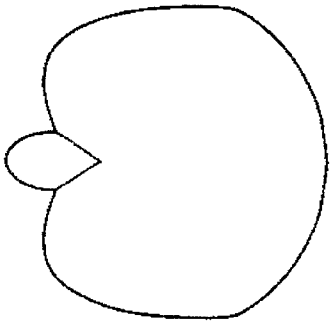
Figure 2C:
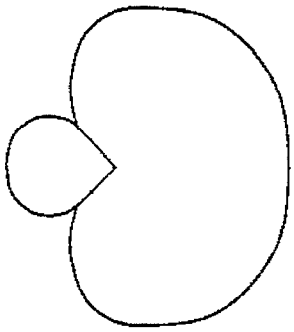
Figure 3:
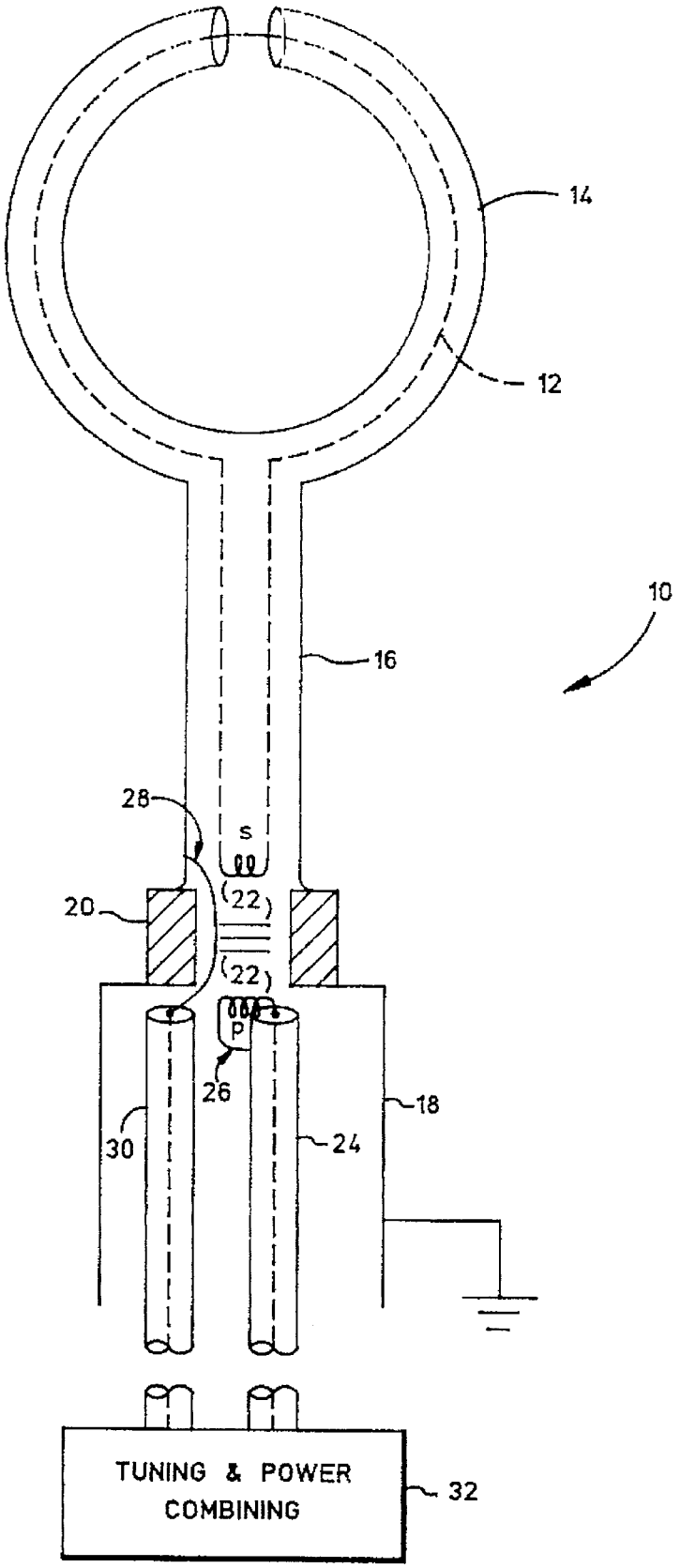
In FIG. 3, one embodiment of an antenna according to the invention is shown incorporating a single loop.

Referring to FIG. 3 there is shown a dual-feed, dual-mode antenna 10 according to the invention. Antenna 10 is made up of a loop antenna element 12 surrounded by a tubular shield 14 and mast 16. Antenna 12 is suspended within tubular shield 14 and tubular mast 16 by conventional means not shown, with the antenna being exposed at a gap in shield 14 opposite mast 16. Shield 14 and mast 16 together make up a monopole antenna element in which loop-shaped shield 14 provides the benefit of top-loading. Mast 16 may be attached to optional conducting support 18 and is insulated therefrom by insulator 20.

The invention provides a dual-mode antenna capable of receiving and transmitting, and more specifically provides loop and monopole antenna element excitation without one element adversely affecting the other element. This is done through a single isolation transformer/balun 22 that converts the "unbalanced" coaxial loop antenna feed line 24 to the "balanced" loop antenna 12. Isolation transformer 22 also provides the isolation needed to decouple loop feed 26 from the voltage of monopole feed 28 of monopole feed coaxial 30.

The components on the high side of the monopole feed (shield 14 and mast 16) are driven in common mode (at the monopole feed voltage) by the monopole feed. Both sides of the transformer windings connected to the loop antenna element will be at this same voltage (the monopole feed voltage). Thus, there will be no voltage drop across the transformer windings due to the monopole feed voltage and hence no coupling back to the loop feed transmitter.

Also shown in FIG. 3 is a tuning, matching and power combining unit 32 provided to serve these functions. One embodiment of this unit is shown in FIG. 4.

Figure 4:
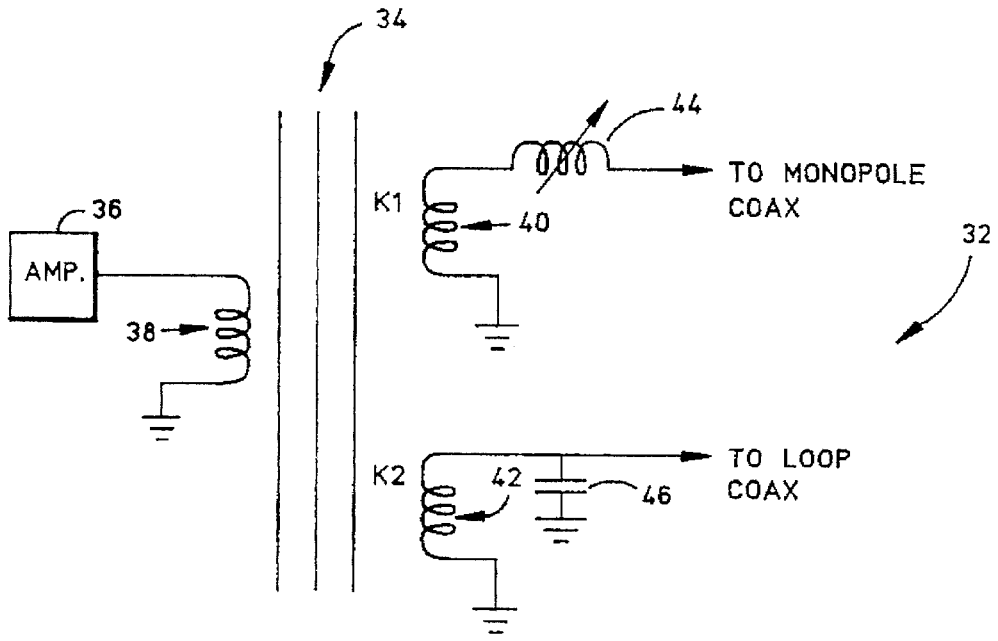
In FIG. 4, tuning, matching and power combining circuitry is shown as may be utilized with the antenna of FIG. 3.

Referring to FIG. 4, this unit is shown to have a multiple secondary transformer 34. An amplifier 36 provides power to primary coil 38 of this transformer. Secondary coils 40 and 42 each have variable coupling coefficients (K) that are variable by, for example, changing coil taps and/or by physically moving transformer coils or cores. In this option it is assumed that the monopole is operated at frequencies below self-resonance and therefore is frequency tuned with inductor 44. The loop antenna is likewise assumed to be operated at frequencies below self-resonance and can be frequency tuned with capacitor 46.

Figure 5:
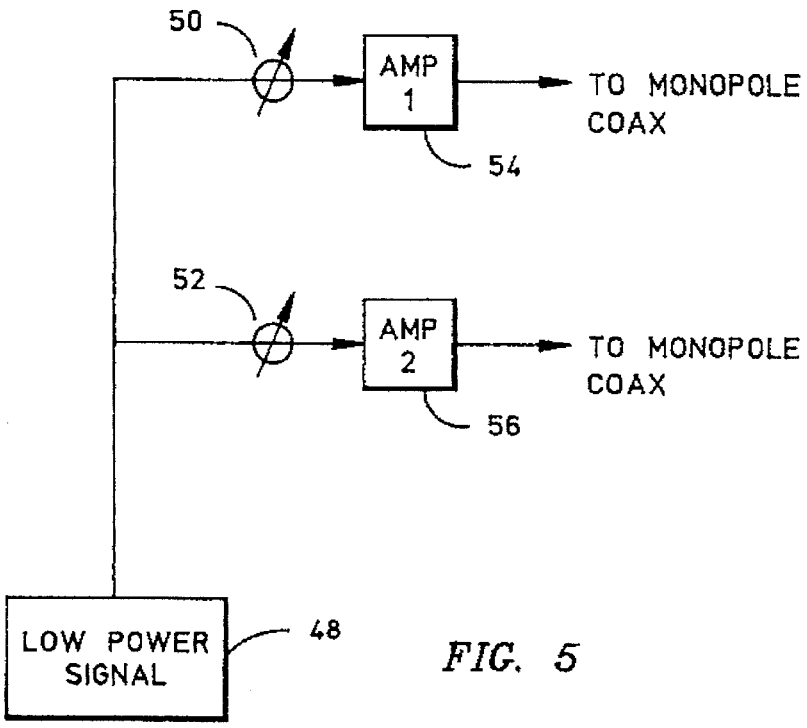
In FIG. 5, an alternative tuning, matching and power combining circuitry is shown as may be utilized with the antenna of FIG. 3.

In FIG. 5 a second option for the tuning, matching and power combining unit 32 of FIG. 3 is shown. In this unit a low power (pre-amplified) signal 48 is sent through adjustable power level controllers 50 and 52 to respective amplifiers 54 and 56. The appropriately conditioned output signals are then passed through monopole coax 30 and loop coax 24 shown in FIG. 3.

Figure 6:
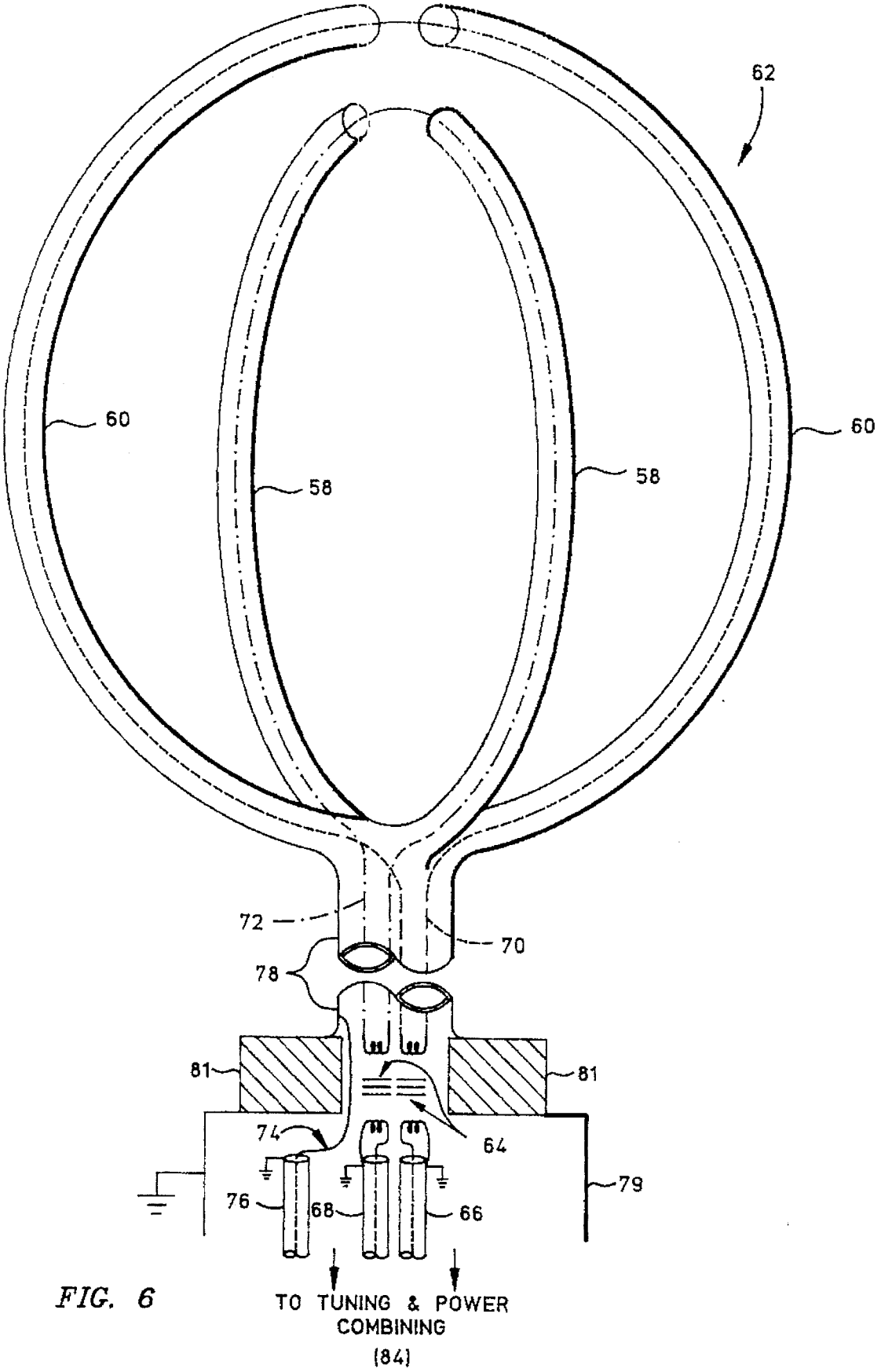
In FIG. 6, a dual-loop antenna according to the invention is illustrated.

Referring now to FIG. 6, an alternative to using a single loop to develop a magnetic dipole mode is to use two orthogonal tubular loops (shown as inner loop 58 and outer loop 60). Antenna 62 utilizes an isolation transformer 64 for each of its loop antennas. In this embodiment, "unbalanced" coaxial feed lines 66 and 68 are converted to the "balanced" loop antennas 70 and 72, respectively, As with the first embodiment of the invention, the isolation transformers provide isolation to decouple monopole antenna feed 74 from loop antenna feeds 66 and 68. Monopole coax 76 provides the monopole feed voltage over feed 74. The components on the high side of the monopole feed (loops 58, 60 and mast 78) are driven in common mode (at the monopole feed voltage) by the monopole feed. As with the first embodiment of the invention, both sides of the transformer windings connected to the loop antennas will be at this same monopole feed voltage, thus resulting in no voltage drop across the transformer windings due to the monopole feed voltage and hence no coupling back to the loop feed transmitters. Incorporating the isolation transformers in this way permits the loop and monopole antenna elements of antenna 62 to be used both in receiving and transmitting modes. These modes can be carried out without either the monopole or loop antennas adversely affecting each other.

Also shown in FIG. 6 is tubular mast 78 attached to optional conducting supporting mast 79 with insulation provided between these structures by insulator 81. As with the first embodiment of the invention, antennas 70 and 72 are suspended within tubular loop shields 58 and 60, respectively, and within tubular mast 78 by conventional means not shown, with the two loop antennas being exposed at shield gaps opposite mast 78.

Figure 7:
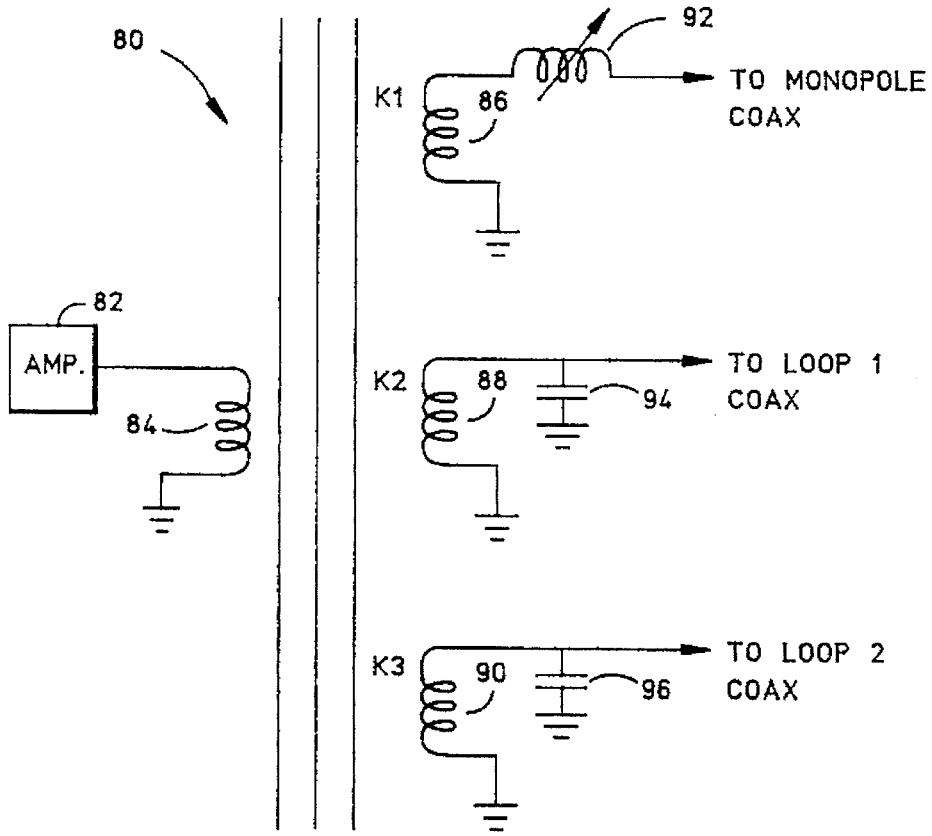
In FIG. 7, tuning, matching and power combining circuitry as may be utilized with the antenna of FIG. 6 is shown.

Referring now to FIG. 7 an embodiment of a tuning, matching and power combining unit is shown as may be used with the embodiment of the invention shown in FIG. 6. In FIG. 7, multiple secondary transformer 80 has amplifier 82 connected to its primary coil 84 side with secondaries 86, 88 and 90 having variable coupling coefficients, K1, K2 and K3, respectively. As with the first embodiment of the invention, these secondaries may be varied by changing tap and/or physically moving transformer coils or cores. In scenarios where the monopole is operated at frequencies below self-resonance, frequency tuning may be accomplished by inductor 92. Likewise where the loops are operated at frequencies below self-resonance, frequency tuning can be accomplished by capacitors 94 and 96.

Figure 8:
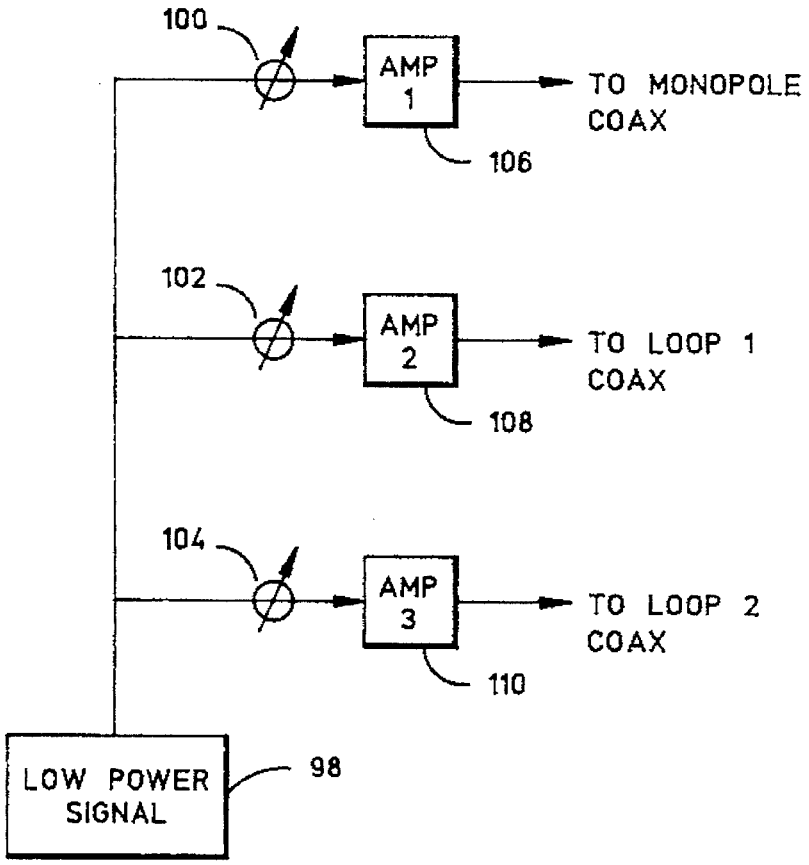
In FIG. 8, an alternative tuning, matching and power combining circuitry as may be utilized with the antenna of FIG. 6 is shown.

In FIG. 8 an alternative tuning, matching and power combiner for antenna 62 is shown. In this embodiment, a low power (preamplified) signal 98 is attenuated by adjustable power level controls 100, 102 and 104 before being fed to amplifiers 106, 108 and 110, respectively. The power controlled amplified signals are then sent to the corresponding monopole and loop coaxes.

For both antenna embodiments, equal amounts of power must be radiated in the monopole and loop to generate a cardioid pattern at low elevation angles. The amount of power supplied in practice will depend upon the relative efficiency of each of the two modes, including its tuning and matching elements. These values will probably have to be determined empirically.

One skilled in the art will realize that by adjusting the dimensions of the loop and mast, approximately equal radiation from the magnetic dipole element and the electric monopole element is possible. Additional alternatives involve the location of tuning elements. The loop tuning capacitance can be located anywhere in the loop as well as on the primary side of the isolation transformer. Locating the capacitors at the top of the loop structure can have the disadvantage of either leaving the antenna tuned to a single frequency or requiring the need to attach power and control lines to the capacitor. These lines would also have to be provided with isolation where they cross the monopole feed point. Another alternative, to facilitate adjustment of amplitude and tuning, is to provide current sensors to bring signals back to a controller. Such sensors could take the form of fiberoptics. The tuning, matching and power combining elements would then be adjusted to provide equal in-phase dipole moments.

The invention provides a compact single antenna structure having dual feeds capable of generating magnetic dipole and electric dipole radiation. The antenna design of the invention utilizes a loop antenna's shield or shields as part of the monopole antenna structure. The loop shields serve to top-load the monopole. Although the invention incorporates more than one antenna element, it is capable of receiving as well as transmitting as antenna element feed lines are insulated and isolated by one or more isolation transformers. The monopole and loop antenna elements are driven in common mode to prevent coupling or voltage flashover from one element to the other. This latter feature permits the invention to be used not only as a receiver but also as a transmitter of electromagnetic radiation.

Obviously, many modifications and variations of the invention are possible in light of the above teachings. It is therefore to be understood that within the scope of the appended claims the invention may be practiced otherwise than has been specifically described.

What is claimed is:

1. A transmitting and receiving antenna apparatus comprising:

a loop antenna;

a monopole antenna including a ground isolated tubular mast and a tubular loop shield electrically coupled to said mast, said mast and shield surrounding said loop antenna except at a gap in said shield opposite said mast;

a loop antenna feed;

an isolation transformer providing electrical coupling between said loop antenna and said loop antenna feed; and a monopole antenna feed electrically coupled to said monopole antenna.

2. An apparatus according to claim 1 in which said loop antenna and said monopole antenna are driven at a common voltage when in a transmitting mode.

3. An apparatus according to claim 2 in which a voltage drop between said monopole antenna feed and said monopole antenna occurs across said isolation transformer.

4. An apparatus according to claim 3 in which said loop antenna is balanced and in which said loop antenna feed is unbalanced and in which said isolation transformer converts said unbalance loop antenna feed to said balanced loop antenna.

5. An apparatus according to claim 4 in which said loop antenna feed and said monopole antenna feed are operably coupled to tuning, matching and power combining means.

6. An apparatus according to claim 5 in which said loop antenna and said monopole antenna are operated below resonance and in which said tuning, matching and power combining means includes an inductive frequency tuner for said monopole antenna feed and a capacitive frequency tuner for said loop antenna feed.

7. An apparatus according to claim 5 in which said tuning, matching and power combining means includes a low power signal source for providing a low power signal to a first power level tuner having an output of which is passed to a first amplifier having an output passed to said loop antenna feed, and a second power level tuner having an output of which is passed to a second amplifier having an output passed to said monopole antenna feed.

8. An apparatus according to claim 1 in which said monopole antenna feed is directly electrically coupled to said monopole antenna.

9. A transmitting and receiving antenna apparatus comprising:

inner and outer loop antennas;

a monopole antenna including a ground isolated tubular mast and inner and outer tubular loop shields electrically coupled to said mast, said inner and outer tubular loop shields having axis orthogonal to one another and to a longitudinal axis of said mast, said loop antennas being surrounded by said mast and their respective shields except at gaps in said shields opposite said mast;

an inner loop antenna feed;

an outer loop antenna feed;

an isolation transformer providing electrical coupling between said inner loop antenna and said inner loop antenna feed;

an isolation transformer providing electrical coupling between said outer loop antenna and said outer loop antenna feed; and a monopole antenna feed electrically coupled to said monopole antenna.

10. An apparatus according to claim 9 in which said monopole antenna feed is directly electrically coupled to said monopole antenna.

11. An apparatus according to claim 9 in which said loop antennas and said monopole antenna are driven at a common voltage when in a transmitting mode.

12. An apparatus according to claim 11, in which a voltage drop between said monopole antenna feed and said monopole antenna occurs across said isolation transformers.

13. An apparatus according to claim 12 in which said loop antennas are balanced and in which said loop antenna feeds are unbalanced and in which said isolation transformers convert said unbalance loop antenna feeds to said balanced loop antennas.

14. An apparatus according to claim 13 in which said loop antenna feeds and said monopole antenna feed are operably coupled to tuning, matching and power combining means.

15. An apparatus according to claim 14 in which said loop antennas and said monopole antenna are operated below resonance and in which said tuning, matching and power combing means includes an inductive frequency tuner for said monopole antenna feed and an individual capacitive frequency tuner for each of said loop antenna feeds.

16. An apparatus according to claim 14 in which said tuning, matching and power combining means includes a low power signal source for providing a low power signal to a first power level tuner having an output of which is passed to a first amplifier having an output passed to said inner loop antenna feed, a second power level tuner having an output of which is passed to a second amplifier having an output passed to said outer loop antenna feed, and a third power level tuner having an output of which is passed to a third amplifier having an output passed to said monopole loop antenna feed.

* * * * *